(12) United States Patent
Maddern et al.

(10) Patent No.: US 10,325,381 B2
(45) Date of Patent: Jun. 18, 2019

(54) LOCALISING PORTABLE APPARATUS

(71) Applicant: The Chancellor Masters and Scholars of the University of Oxford, Oxford, Oxfordshire (GB)

(72) Inventors: William Paul Maddern, Oxford (GB); Alexander Douglas Stewart, Oxford (GB); Paul Michael Newman, Oxford (GB); Geoffrey Michael Pascoe, Oxford (GB)

(73) Assignee: The Chancellor Masters and Scholars of The University of Oxford, Oxford (GB)

( * ) Notice: Subject to any disclaimer, the term of this patent is extended or adjusted under 35 U.S.C. 154(b) by 77 days.

(21) Appl. No.: 15/528,429

(22) PCT Filed: Jul. 17, 2015

(86) PCT No.: PCT/GB2015/052075
§ 371 (c)(1),
(2) Date: May 19, 2017

(87) PCT Pub. No.: WO2016/079466
PCT Pub. Date: May 26, 2016

(65) Prior Publication Data
US 2018/0342080 A1     Nov. 29, 2018

(30) Foreign Application Priority Data
Nov. 21, 2014   (GB) .................................... 1420731.0

(51) Int. Cl.
*G06T 7/00*      (2017.01)
*G06T 7/73*      (2017.01)
(Continued)

(52) U.S. Cl.
CPC ................ *G06T 7/75* (2017.01); *G01C 21/32* (2013.01); *G06T 5/40* (2013.01); *G06T 17/05* (2013.01);
(Continued)

(58) Field of Classification Search
None
See application file for complete search history.

(56) References Cited

U.S. PATENT DOCUMENTS

2013/0051626 A1* 2/2013 Abadpour ................ G06T 7/73
                                                382/106
2014/0098242 A1* 4/2014 Sharma ................ H04N 17/002
                                                348/175
2014/0240501 A1* 8/2014 Newman .................. G06T 7/77
                                                348/148

FOREIGN PATENT DOCUMENTS

WO     2013045932 A1    4/2013
WO     2016079466 A1    5/2016

OTHER PUBLICATIONS

International Search Report and Written Opinion received for Patent Application No. PCT/GB2015/052075, dated Oct. 7, 2015. 15 pages.
(Continued)

*Primary Examiner* — Delomia L Gilliard
(74) *Attorney, Agent, or Firm* — Finch & Maloney PLLC (57) ABSTRACT

A method of localizing portable apparatus (100) in an environment, the method comprising obtaining captured image data representing an image captured by an imaging device (106) associated with the portable apparatus, and obtaining mesh data representing a 3-dimensional textured mesh of at least part of the environment. The mesh data is processed to generate a plurality of synthetic images, each synthetic image being associated with a pose within the environment and being a simulation of an image that would
(Continued)

be captured by the imaging device from that associated pose. The plurality of synthetic images is analyzed to find a said synthetic image similar to the captured image data, and an indication is provided of a pose of the portable apparatus within the environment based on the associated pose of the similar synthetic image.

18 Claims, 9 Drawing Sheets

(51) Int. Cl.
    *G01C 21/32*     (2006.01)
    *G06T 5/40*     (2006.01)
    *G06T 17/05*     (2011.01)

(52) U.S. Cl.
    CPC ............... *G06T 2207/10028* (2013.01); *G06T 2207/20041* (2013.01); *G06T 2207/30244* (2013.01); *G06T 2207/30252* (2013.01)

(56) References Cited

OTHER PUBLICATIONS

GB Intellectual Property Office Search Report under Section 17(5) received for GB Patent Application No. 1420731.0 dated May 19, 2015. 3 pages.
Caron, et al., "Direct model based visual tracking and pose estimation using mutual information," Image and Vision computing, Elsevier, vol. 32, No. 1, Nov. 7, 2013. pp. 54-63.
Zabulis, et al., "3D Pose Refinement Using Rendering and Texture-Based Matching," ICCVG 2014, LNCS 8671. pp. 672-679.
Solh, M. and Alregib, G., "Hierarchical Hole-Filling for Depth-Based View Synthesis in FTV and 3D Video," IEEE Journal of Selected Topics in Signal Processing, vol. 6, No. 5, Sep. 2012. pp. 495-504.
Ruijters, D. and Thevenaz, P., "GPU Prefilter for Accurate Cubic B-spline Interpolation," The Computer Journal Advance Access, published Dec. 5, 2010. 6 pages.
Pascoe, et al., "FARLAP: Fast Robust Localisation using Appearance Priors," IEEE International Conference on Robotics and Automation. May 1, 2015. pp. 6366-6373.
Pascoe, et al., "Robust Direct Visual Localisation using Normalised Information Distance," 26th British Machine Vision Conference. Sep. 10, 2015. pp. 1-13.
International Preliminary Report on Patentability received for Patent Application No. PCT/GB2015/052075, dated Jun. 1, 2017. 10 pages.

* cited by examiner

LOCALISING PORTABLE APPARATUS

The present invention relates to mapping and localising portable apparatus such as a vehicle within an environment.

State-of-the-art localisation systems for autonomous vehicles rely on high-cost laser-based sensors, such as the Velodyne™, produced by Velodyne Acoustics, Inc. Whilst these sensors provide high fidelity information about the vehicle's environment, their cost makes them a challenging proposition for many robotics applications, in particular for mainstream adoption of autonomous vehicles.

Embodiments of the present invention are intended to address at least some of the problems identified above.

Embodiments of the present invention can utilise cameras fitted to/on portable apparatus at run time, in conjunction with a prior model of the environment. This can allow a small number of survey vehicles equipped with laser sensors, which infrequently visit all roadways/environments, to build high-quality maps. By exploiting the information thus made available as a prior, vehicles can then localise using only monocular cameras. Such an approach can shift the expensive sensing equipment onto just the few specialist survey vehicles, dramatically reducing the cost of autonomous vehicles.

Embodiments of the present invention can provide a system which uses laser and camera data from the survey vehicle to build fully textured 3-dimensional meshes of the environment. Along with knowledge of the projective properties of the cameras, this can allow generation of a synthetic image showing what a camera located at any point in the map would see. Equipped with such a camera, embodiments can localize, by finding the pose in the map at which the expected image from the prior most closely matches the live image.

Embodiments can make use of Normalised Information Distance (NID) to evaluate the similarity between live camera image and the images generated from the prior. This differs from known dense localisation approaches in that it does not rely on the actual colours in the camera image matching those in the prior. Embodiments can apply non-linear distortion, using a look-up table, to distort the mesh before colouring it. This allows embodiments to make use of cameras with very wide fields of view, significantly increasing the size of the region in which the system can converge on the true pose.

The computational power required to generate and evaluate synthetic images is typically very high. Embodiments of the method described herein, however, can be highly data parallel, operating independently on each pixel. Thus, embodiments can make use of the rendering and parallel computation abilities of modern graphics processing units (GPUs) to enable real-time operation.

According to one aspect of the present invention there is provided a method of localising portable apparatus in an environment, the method comprising:

obtaining captured image data representing an image captured by an imaging device associated with the portable apparatus;

obtaining mesh data representing a 3-dimensional textured mesh of at least part of the environment;

processing the mesh data to generate a plurality of synthetic images, each said synthetic image being associated with a pose within the environment and being a simulation of an image that would be captured by the imaging device from that associated pose;

analysing the plurality of synthetic images to find a said synthetic image similar to the captured image data, and providing an indication of a pose of the portable apparatus within the environment based on the associated pose of the similar synthetic image.

The step of processing the mesh data may comprise:

obtaining distortion data representing a distortion produced by a lens of the imaging device, and using the distortion data to generate a said synthetic image.

The step of using the distortion data may comprise:

mapping undistorted image coordinates of the synthetic image to distorted image coordinates of the synthetic image based on the distortion data, e.g. using a B-spline interpolation process to interpolate a look-up table that represents a mapping of the undistorted image coordinates to the distorted image coordinates.

The step of analysing the plurality of synthetic images to find a said synthetic image similar to the captured image data may comprise finding a minimum of a cost function of a said synthetic image and the captured image data. The cost function may comprise Normalised Information Distance (NID).

Embodiments may use Broyden-Fletcher-Goldfarb-Shanno (BFGS) algorithm to find the minimum NID.

The method may include:

using the BFGS algorithm to find the minimum NID of a joint histogram based on a said synthetic image and the captured image data;

applying the B-spline interpolation process to find a Jacobian for the look-up table;

using depth information from the synthetic image to produce a spatial Jacobian for the synthetic image;

applying the B-spline interpolation process to the synthetic image to produce an appearance Jacobian for the synthetic image;

generating a histogram Jacobian based on the joint histogram and the appearance Jacobian for the synthetic image, and using the histogram Jacobian with the BFGS algorithm to find the minimum NID.

The step of applying the B-spline interpolation process to the synthetic image to produce the Jacobian image for the synthetic image may comprise:

executing a B-spline pre-filter over the synthetic image to produce a differentiable image with pixel values useable as control points for a B-spline, producing a continuous, differentiable intensity surface using the control points, and differentiating the surface to produce the Jacobian image for the synthetic image.

The step of processing the mesh data to generate the plurality of synthetic images may comprise for a said synthetic image:

generating the synthetic image at a first resolution;

generating the synthetic image at a second resolution, wherein the second resolution is relatively lower than the first resolution, and using the second resolution synthetic image to fill gaps in the first resolution synthetic image in order to generate the synthetic image. This can blur edges of non-textured regions of the synthetic image, thereby preventing large derivatives at those boundaries.

The finding of the minimum of the cost function and the generation of the synthetic images may be performed on a GPU in some embodiments. The GPU may perform the finding of the minimum of the cost function using data-parallel operations.

The synthetic images can be generated by OpenGL™, and shared with OpenCL (http://www.khronos.org/opencl/) kernels, in order to perform calculation relating to the histograms and the NID.

The step of obtaining the mesh data may comprise:

obtaining a set of scans representing a 3D survey of part the environment;

generating a mesh using the set of scans;

obtaining a set of captured images corresponding to the part of the environment of the set of scans, and projecting the mesh into each image in the set of captured images to produce the textured mesh data.

The step of projecting the mesh into each image in the set of captured images may comprise:

projecting the mesh into a said image using a projective property (e.g. distortion produced by a lens) of a device, e.g. camera, used to capture the image, and distorting the mesh according to the projective property.

A look-up-table based distortion model can be used to distort the mesh according to the same distortion as the camera lens.

According to another aspect of the present invention there is provided a device adapted to localise portable apparatus in an environment, the device comprising:

a component configured to obtain captured image data representing an image captured by an imaging device associated with the portable apparatus;

a component configured to obtain mesh data representing a 3-dimensional textured mesh of at least part of the environment;

a component configured to process the mesh data to generate a plurality of synthetic images, each said synthetic image being associated with a pose within the environment and being a simulation of an image that would be captured by the imaging device from that associated pose;

a component configured to analyse the plurality of synthetic images to find a said synthetic image similar to the captured image data, and a component configured to provide an indication of a pose of the portable apparatus within the environment based on the associated pose of the similar synthetic image.

The lens of the imaging device may comprise a wide angle lens.

The invention may further provide a vehicle including a device substantially as described herein.

According to further aspect of the present invention there is provided a method of generating textured mesh data useable for mapping an environment, the method comprising:

obtaining a set of scans representing a 3D survey of part the environment;

generating a mesh using the set of scans;

obtaining a set of captured images corresponding to the part of the environment of the set of scans, and projecting the mesh into each image in the set of captured images to produce a textured mesh.

The mesh may be stored as a set of slices, each slice in the set comprising triangles between two adjacent scans in the set of scans.

The step of projecting the mesh into each image may comprise projecting each said slice in the set of slices into corresponding ones of the captured images of the set of captured images.

According to another aspect of the present invention there is provided computer readable medium storing a computer program to operate methods substantially as described herein.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
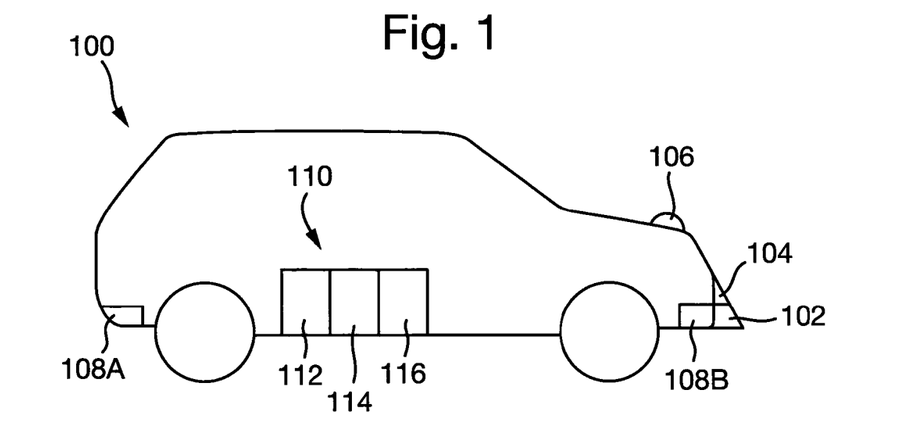
FIG. 1 is a schematic illustration of transportable apparatus within an environment.

FIG. 1 illustrates schematically transportable apparatus in the form of a vehicle 100 that is fitted with various sensors/imaging devices. The example vehicle is shown as including devices that are used for generating mesh data and also for localisation. However, it will be understood that in other cases, portable apparatus only fitted with devices used for generating mesh/map data may be provided, whilst another portable apparatus may be provided that only includes devices used for localisation.

In order to build the mesh data, the example vehicle 100 is equipped with a device for producing 3D survey data of the environment through which it travels and a number of cameras/image capturing devices. In the illustrated example a 2-D push-broom LIDAR scanner 102 (e.g. a vertical SICK LMS-151 laser scanner), mounted on the front of the vehicle, is used, although it will be understood that other devices for directly generating 3D survey data could be used and/or may be arranged in a different manner. In the illustrated example a forward-facing stereo camera 104 (e.g. a Point Grey Bumblebee2) mounted at the front of the vehicle is used to obtain visual odometry. Visual odometry can be used to estimate the motion of the vehicle between subsequent scans of the LIDAR scanner, giving the 3-dimensional pose of each scan. However, it will be appreciated that other type of odometers, e.g. a wheel odometer, could be used in alternative embodiments. As will be described below, mesh data can be generated by stitching together adjacent points from neighbouring scans, discarding anomalous triangles. Whilst the visual odometry may not provide globally accurate maps, it is considered sufficient to create locally coherent metric maps over short distances.

The vehicle 100 can further include a device for capturing images, which can be used to colour/texture the meshes, as described below. In the illustrated example, the vehicle includes a Point Grey Ladybug2 spherical camera 106. It will be understood that a video or still camera could be used and also that the image data used need not necessarily be conventional (colour, monochrome or grey-scale) images generated in day/ambient light. For example, alternative embodiments can use additional light-sources or flashes, the images could be infra-red images, hyper-spectral imagery, etc.

The example vehicle 100 also includes at least one image capturing device for use in localisation. The illustrated example vehicle includes four Point Grey Grasshopper2 monocular cameras, fitted with wide-angle fisheye lenses. These cameras (two only 108A, 108B visible in FIG. 1) are mounted pointing slightly down, approximately 45° left and right of the forwards and rear direction of the vehicle respectively. Again, it will be understood that the type, number and/or arrangement of these image capturing devices can vary.

The vehicle 100 further includes a computing device 110 having a processor 112, memory 114 and (wired or wireless) interface(s) 116 for communicating with the various sensors and/or remote devices. In some embodiments, the computing device may comprise a Graphics Processing Unit (GPU). The computing device can be configured to execute code for generating mesh data and/or using mesh data to localise the vehicle as described below. In alternative embodiments, data from at least one of the sensors/devices mounted on the vehicle may be transferred to a remote computing device for processing rather than being processed by an on board computing device. Also, data produced by a remote device may be transferred to the vehicle for use in localisation, rather than being generated by an on board computing device.

Although the example vehicle 100 is a land-based vehicle travelling along a road/ground surface, it will be appreciated that in alternative embodiments, the vehicle could be any type of vehicle (including air and water-based vehicles) that may be travelling through any kind of conventional indoor/outdoor environment. Further, in other embodiments, the sensors and the computing device need not be fitted to/on a vehicle, but can be included in at least one remote device, e.g. a hand-held navigation device. In some cases, some of the devices may be separate (or separable) from each other. For instance, a camera may not be directly connected to/in the same housing as a processor that performs localisation, e.g. a separate camera device held by a user may be used to provide image data that is transferred to another processing device.

Figure 2:
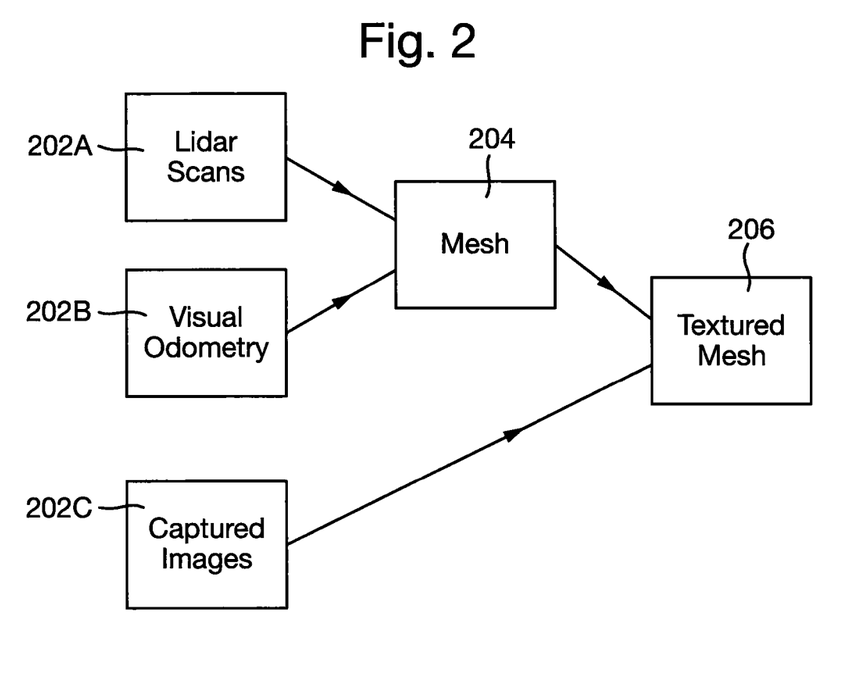
FIG. 2 is a flowchart showing steps performed by an example embodiment to generate a textured mesh useable to map the environment.

FIG. 2 illustrates steps that can be performed by the computing device 110 (or another suitable computing device that may be remote from the vehicle 100) to generate textured mesh data. It will be appreciated that the steps of the flowcharts given herein are exemplary only and in alternative embodiments at least some of the steps may be re-ordered or omitted, and/or additional steps may be performed. It will also be understood that the processes can be implemented using any suitable hardware, software, programming languages and data structures.

Embodiments of the mapping approach typically comprise of two stages: first, generating the geometry of the mesh using the 3D survey data, and then texturing it using camera images. In some embodiments it is possible to skip the second stage and use laser reflectance rather than camera images to colour the mesh. The mesh can be built by stitching together subsequent scans from the push-broom LIDAR 102. The resulting mesh can then be projected in turn into each image captured by the camera 106 to generate a texture for each triangle.

Figure 3A:
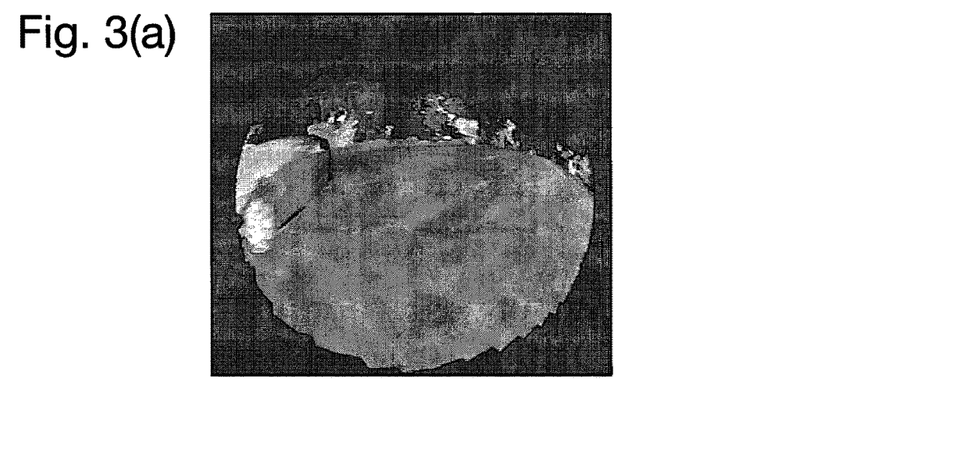
FIG. 3(a) illustrates a mesh image of an example location.

At step 202A data relating to a 3D survey of the part of the environment is received, e.g. scan data produced by the LIDAR scanner 102. At step 202B odometry data is received, e.g. the data produced by the camera 104 at (at least approximately) the same time period as the data received at step 202A. At step 204 a triangulation process is applied to the data received at steps 202A, 202B in order to produce mesh data. The resulting map mesh can be stored as a series of 'slices', each consisting of the triangles between two adjacent scans. This can allow easy dynamic loading of any subsection of the map with minimal overhead. FIG. 3(a) shows an example of an un-textured mesh.

At step 202C image data representing an image captured by the spherical camera 106 at (at least approximately) the same time period as the survey/odometry data provided at steps 202A, 202B is obtained. In order to generate textures for the map, the mesh is projected into each image from the vehicle's camera in turn (this camera does not need to be the same one that will be used for localisation). Thus, at step 206, the image data is used to texture the mesh generated at step 204 using a suitable technique, such as perspective projection or ray-tracing.

Figure 3B:
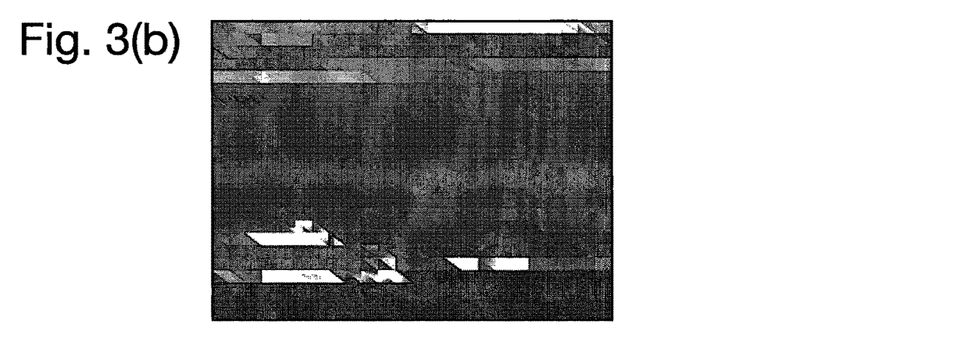
FIG. 3(b) illustrates a projection of the mesh into a camera image.
Figure 3C:
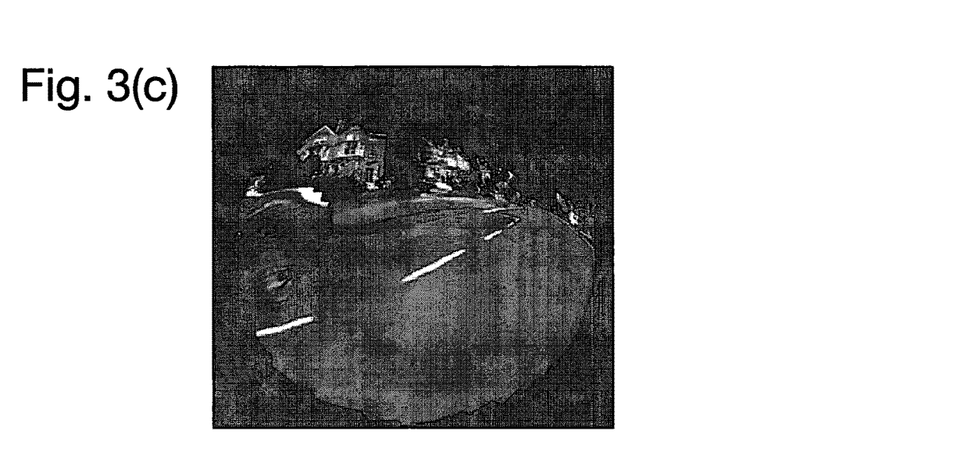
FIG. 3(c) illustrates a combined textured mesh image.

For each triangle, the image in which its projection is largest is selected as this normally gives the highest resolution textures. FIG. 3(b) shows all the textures for the triangles in a single slice from many different input images, whilst FIG. 3(c) shows the final result, where all the slices are combined with their textures.

Figure 4:
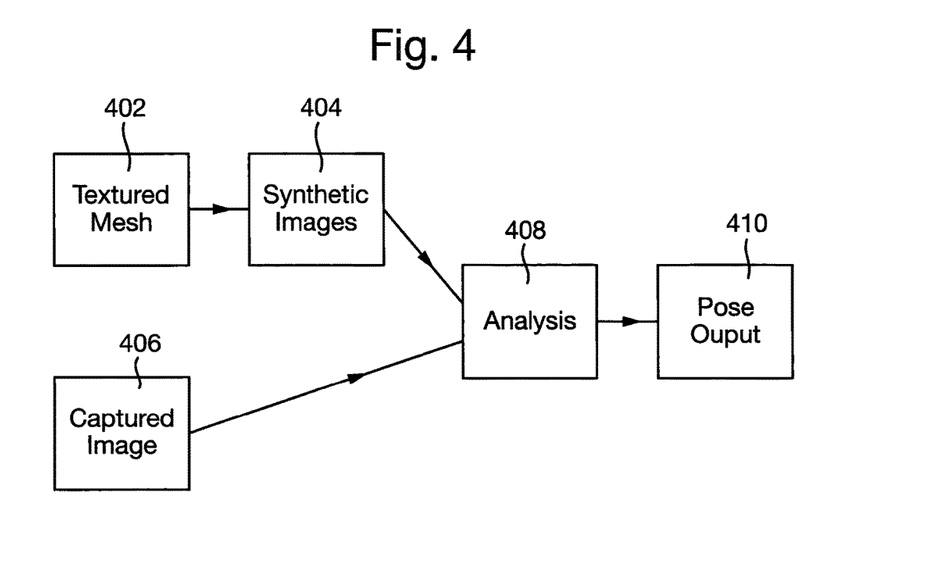
FIG. 4 is a flowchart showing general steps performed by embodiments to localise a vehicle in the environment using camera images provided from the vehicle in combination with the textured mesh data.

FIG. 4 is a flowchart illustrating in general steps that can be executed, for example, by the computing device 110 when the vehicle 100 is performing localisation. Embodiments of the localisation process attempt to find the vehicle pose at which a synthetic image produced from the prior mesh data best matches a live image captured by a camera on board the vehicle.

At step 402 data representing at least some of the textured mesh is received. At step 404, the 3D textured mesh data is processed to generate 2D synthetic images that synthetically represent images that would be captured by the imaging device at a particular pose within the environment. An initial pose estimate can be provided, e.g. using a weak localiser such as GPS; a topological localizer, such as the known SeqSLAM technique, or even by starting from a known location, such as a garage.

In some embodiments the cameras 108 used for localisation can have very wide-angle lenses. Attempting to un-distort these images can result in large regions of the image being interpolated from a small number of pixels. Instead of un-distorting live images, the inventors chose to distort the synthetic image generated from the prior. A look-up-table based distortion model can be used to create virtual images with the same distortion as the camera lens.

As it is possible to distort the mesh before texturing it, this can provide sharp textures in the distorted image. In some embodiments, the distortion can be done on the GPU in the same vertex shader that carries out the original projection (step 206); it is not necessary to actually generate the undistorted projection of the mesh. As a result, applying distortion adds almost no time to the rendering pipeline. Furthermore, building these images only requires a discrete lookup table obtainable by intrinsic calibration, no knowledge of the actual camera distortion function is needed. These models can be obtained using the "OCamCalib" toolbox described in D. Scaramuzza, A. Martinelli, and R. Siegwart, "A toolbox for easily calibrating omnidirectional cameras," in IEEE International Conference on Intelligent Robots and Systems, 2006, pp. 5695-5701, for example.

Figure 5A:
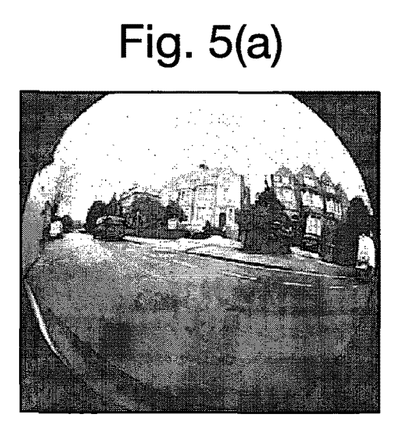
FIG. 5(a) illustrates an image of an example location produced by a wide angle lens camera.
Figure 5B:
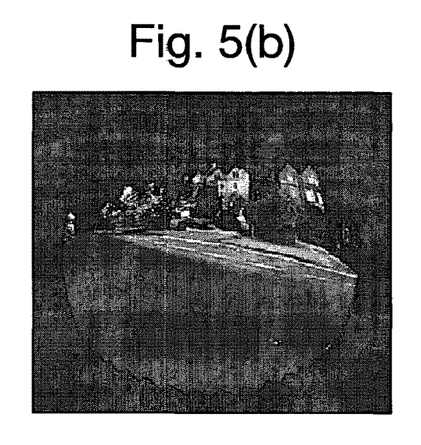
FIG. 5(b) illustrates a distorted projection of the example location based on the texture mesh map data.
Figure 5C:
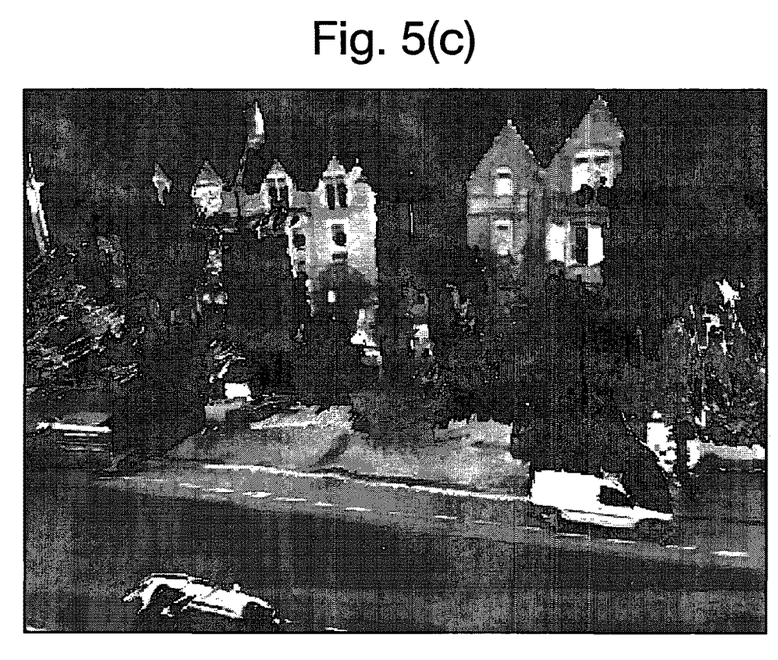
FIG. 5(c) illustrates a bird-eye view of the example location.

FIG. 5(*a*) shows an example live camera image, whilst FIG. 5(*b*) shows a projection of the prior using a highly distorted model. FIG. 5(*c*) shows a birds-eye view of the prior at the same location.

At step 406, 2D image data captured by at least one of the cameras 108 is received. At step 408, the process searches for the synthetic image most similar to the live image data, typically using an information-theoretic measure of image similarity, as will be described below in more detail.

At step 410 an estimate of a pose of the vehicle 100 within the environment, based on the pose information associated with the similar synthetic image, is generated. This can be used to navigate the vehicle (e.g. using it as an input into a control system), displayed to an on-board or remote user, etc.

Figure 6:
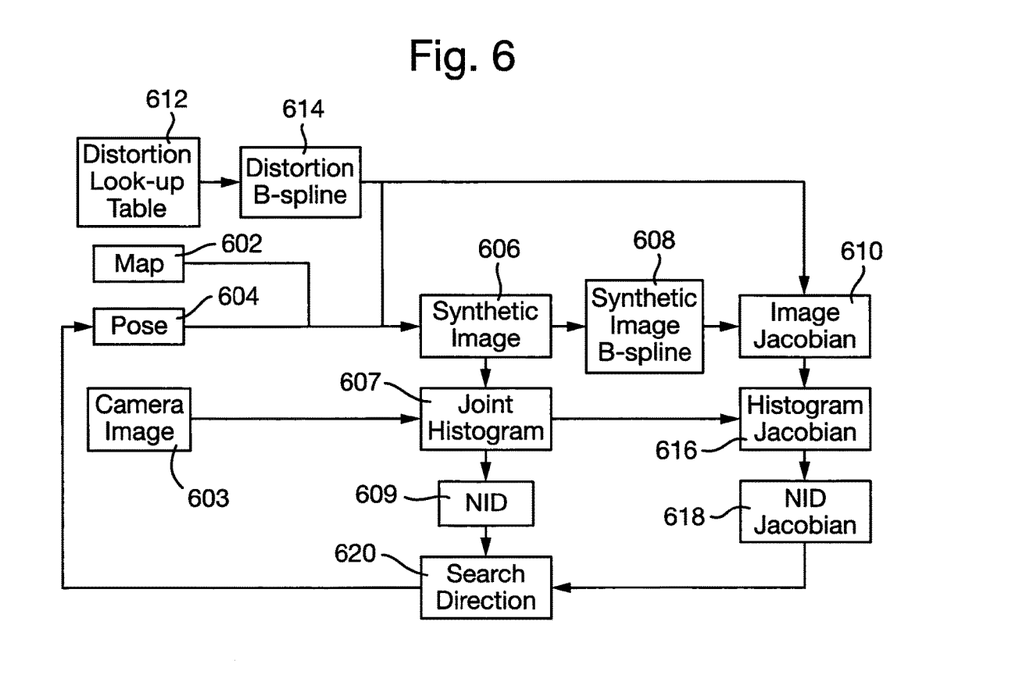
FIG. 6 is a flowchart showing detailed steps performed by an example embodiment to localise a vehicle in the environment.

FIG. 6 is a flowchart showing a more detailed example localisation method. In order to choose the pose which best matches the prior to live camera images, the inventors selected a function for evaluating image similarity. It is not possible to simply take the differences between respective pixels because reliance on pixel values is not robust to changes in appearance. Given that road vehicles need to be able to localise under many different lighting conditions and long term changes in appearance, this is not acceptable. Furthermore, different cameras will produce different colours, and it is not desirable to be limited to only being able to localise with exactly the same camera that was used to build the map.

Mutual information provides a robust way to compare entire images. The fact that mutual information depends only on the distribution of pixel values, not the actual values, means that it is usable with images captured by different sensors, and is robust to changes in appearance. Mutual information, however, has the problem of being dependent on how much overlap there is between two images, which can cause problems because synthetic priors will have large gaps (e.g. sky). The inventors chose to use Normalised Information Distance (NID) for preferred embodiments. This is a metric with similar properties to mutual information, but which is not dependent on the number of pixels of overlap. However, it will be understood that alternative algorithms/methods could be used to determine similarity between images, e.g. photo-consistency (based on colour similarity), or sum of absolute differences, although these are not so desirable because they are not as robust with regards to changes in appearance, sensors, etc.

In an embodiment (e.g. that of FIG. 6) that uses NID, given two images, A and B, the NID is given by equation (1):

$$NID(A, B) = \frac{H(A, B) - MI(A, B)}{H(A, B)} \quad (1)$$

Here, H and MI represent entropy and mutual information respectively, given by equations (3) and (4):

$$H(A) = -\sum_{a \in A} p_a \log(p_a) \quad (2)$$

$$H(A, B) = -\sum_{a \in A} \sum_{b \in B} p_{ab} \log(p_{ab}) \quad (3)$$

$$MI(A, B) = H(A) + H(B) - H(A, B) \quad (4)$$

where $p_a$ and $p_{ab}$ are probabilities of binned intensity values from an image histogram and joint histogram (607), respectively. The example embodiment uses histograms with 32 bins.

The example localisation method of FIG. 6 can receive as inputs prior map/mesh data 602 (which may be received either as a single block of data or as specific portions on request), and data 603 representing an image captured by a camera on-board the vehicle 100, e.g. one of the monocular cameras 108.

Given an initial 6-Degree Of Freedom (DOF) vehicle pose 604 relative to the prior map, $G_{V\ P}$, it is possible to generate a virtual image $I^*(G_{V\ P})$ 606 showing what a camera should be seeing at that point. In order that the synthetic image may substantially match the live image 203 captured by the camera, the synthetic image is distorted in a manner that is intended to simulate characteristics of the camera that captured the image, in particular the synthetic image is distorted to reflect the wide-angle lens of the camera in the example embodiment. As will be described below, data from a discrete lookup table 612 and a B-spline interpolation process 614 can be used for this purpose. It will also be understood that alternative embodiments can involve generating synthetic images that simulate characteristics of the live image camera/lens (other than/in addition to the lens distortion). For instance, the synthetic images could simulate lens flare (which would require modelling of further scene elements, including the location(s) of light sources), or spherical and/or chromatic aberration.

The localisation method seeks to find the pose $\hat{G}_{V\ P}$, which can be used to update pose data 604 and provide that as an output when a minimum is found at which the NID between the synthetic image and the live camera image I (input data 603) is minimised. Typically, the processing loop of FIG. 6 continues until a termination condition (normally a zero derivative) is met.

$$\hat{G}_{VP} = \min_{G_{VP}} NID(I, I^*(G_{VP})) \quad (5)$$

It will be appreciated that various algorithms/methods can be used to find the minimum NID, e.g. gradient descent, Newton's method or a grid search. The embodiment of FIG. 6 uses the quasi-Newton Broyden-Fletcher-Goldfarb-Shanno (BFGS) algorithm (see J. Nocedal and S. J. Wright, Numerical Optimization, 1999, vol. 43), which simultaneously estimates the Hessian and carries out the minimisation. In some embodiments this is implemented in Ceres Solver (http://ceres-solver.org), although it will be appreciated that alternative implementations are possible. Usage of BFGS requires calculation of the analytical Jacobian of the NID cost function with respect to the 6-DOF pose (the function inputs).

The derivative of NID with respect to the vehicle pose can be as follows:

$$\frac{dNID}{dG_{VP}} = \frac{\frac{dH(I, I^*)}{dG_{VP}}MI(I, I^*) - H(I, I^*)\frac{dMI(I, I^*)}{dG_{VP}}}{H(I, I^*)^2} \quad (6)$$

The entropy derivatives are given by equations (7) and (8), where n is the number of histogram bins:

$$\frac{dH(I)}{dG_{VP}} = -\sum_{b=1}^{n} \frac{dp_b}{dG_{VP}}(1 + \log p_b) \quad (7)$$

$$\frac{dH(I, I^*)}{dG_{VP}} = -\sum_{a=1}^{n}\sum_{b=1}^{n} \frac{dp_{ab}}{dG_{VP}}(1 + \log p_{ab}) \quad (8)$$

Figure 7:
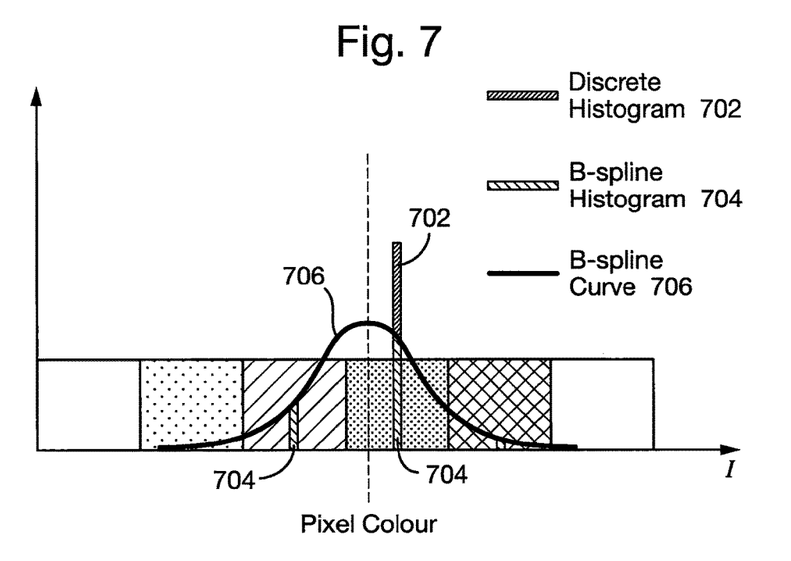
FIG. 7 illustrates an example histogram used in the localisation process.

In a standard formulation of a histogram, the values in the bins are discrete, and thus not differentiable. The present inventors altered the histogram construction to get a continuous function for the histogram distribution. Rather than incrementing the bin into which the intensity of each pixel falls, the process adds the coefficients from a cubic B-spline using supports at the centre of each bin. Cubic B-Spline interpolation can then be used to update four bins for each pixel. As the histogram values then depend not only on which bin a pixel falls into, but also where in that bin the pixel falls, the histogram becomes a continuous function of the pixel values. FIG. 7 shows the effect of adding a single pixel to the histogram.

As the process uses a cubic B-spline, these coefficients are all twice differentiable, and so it can compute analytic derivatives of the histogram values with respect to changes in pixel appearance. To find the Jacobian 610 of pixel intensities with respect to screen coordinates, the process can make use of a cubic B-spline interpolation process 608 to get a continuous, differentiable intensity surface. A B-spline pre-filter can be run over the synthetic image 606 generated from the prior. This gives a differentiable image with pixel values, which when used as the control points for a B-spline, yield the original values at the pixel centres. It is then possible to recover the required Jacobian 610 by differentiating the B-spline surface.

The synthetic image 606 generated from the map data 602 will typically have large gaps in it. This is due to the fact that some areas (e.g. the sky) are not meshed. These regions are ignored in the NID calculations; however, if the B-spline surface was simply built over this raw image, the derivatives would be dominated by the sharp changes at the edges of the non-textured regions. Instead, the synthetic image is rendered at several resolutions (OpenGL™ can be used to do this in hardware in some embodiments, thereby minimising overhead) and use lower resolution images to fill the gaps in the higher resolution images. This can be achieved, for instance, by examining each pixel in the high-resolution image, and if the pixel has no value, it is given the value from the same position in the lower-resolution image. As the lower-resolution image is normally a "blurry" version of the high-resolution image, this leads to a blurring of the edges of the non-textured regions, thus preventing large derivatives at those boundaries. In some embodiments, the synthetic images are rendered at two resolutions, with the lower resolution version being used to fill in gaps in the higher resolution image.

Figure 8A:
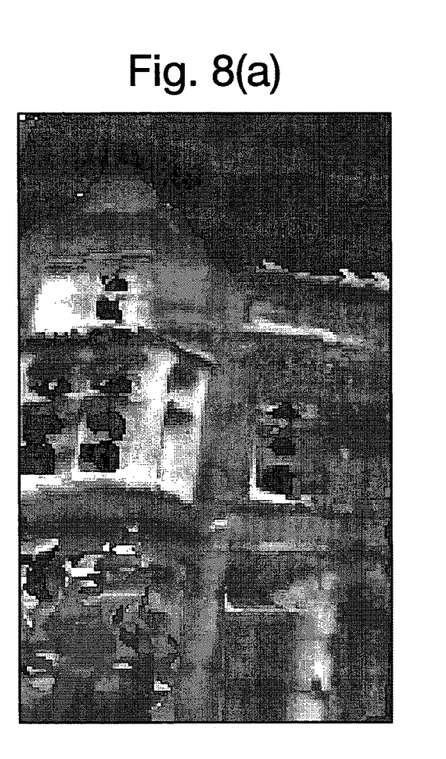
FIGS. 8(a) and 8(b) illustrate example synthetic images used in the localisation process.
Figure 8B:
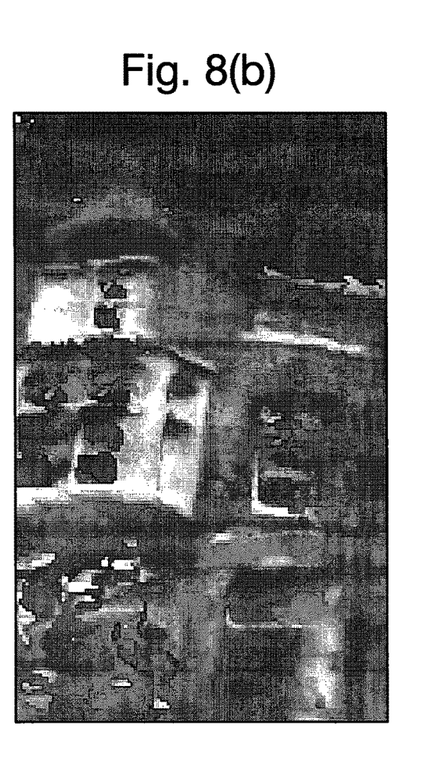
Figure 9A:
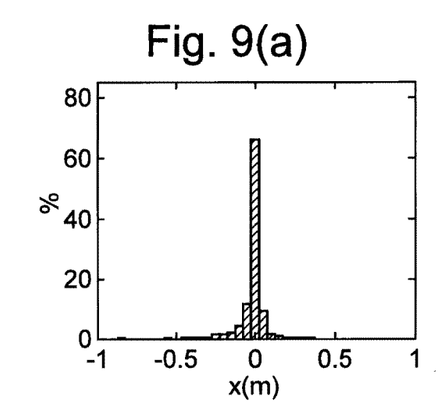
FIGS. 9(a)-9(f) illustrate histograms showing displacement between the localised solution and ground truth for an example localisation process.
Figure 9B:
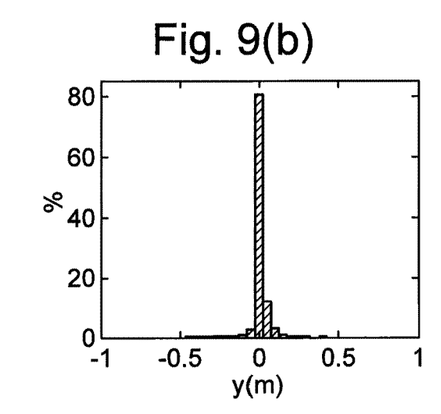
Figure 9C:
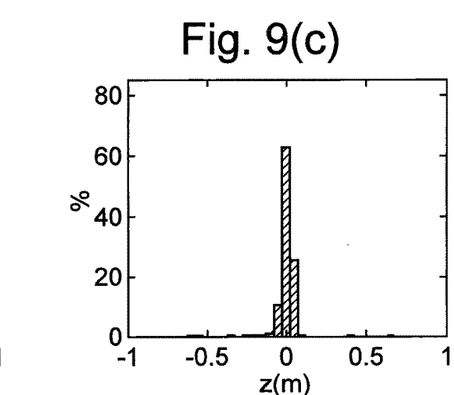
Figure 9D:
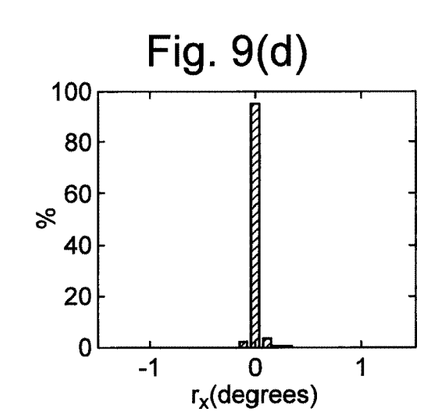
Figure 9E:
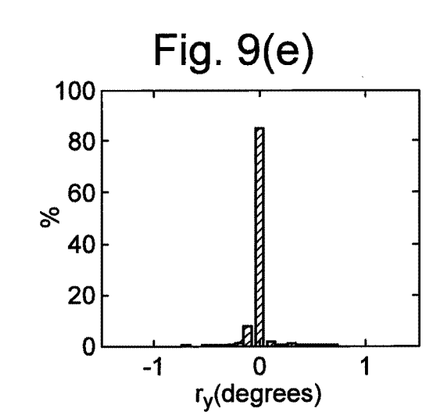
Figure 9F:
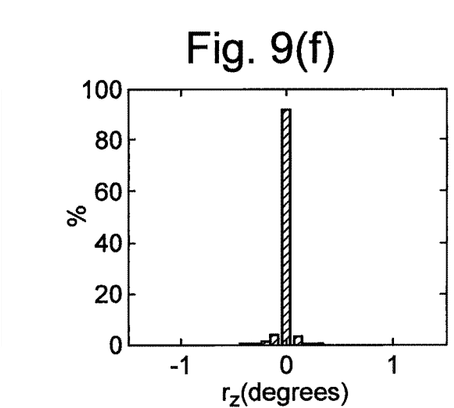

An example of this rendering process is illustrated in FIGS. 8(a)-8(b). In FIG. 8(a) a segment of the higher resolution image is shown, whilst FIG. 8(b) shows the same image filled in with a slightly lower resolution image, producing blurring around edges and filled-in holes in the windows.

The camera distortions can be specified in the form of a discrete lookup table 612 which maps undistorted image coordinates to distorted image coordinates. As a differentiable function is required, once again B-spline interpolation is used (process 614). The final Jacobian required is that which maps derivatives in the vehicle frame to those in image space. This can make use of the depth buffer available in the OpenGL™ rendering pipeline in some embodiments. The Jacobian is given by equation (9):

$$J = \begin{bmatrix} -1/z & 0 & u/z & uv & -(1+u^2) & v \\ 0 & -1/z & v/z & 1+v^2 & -uv & -u \end{bmatrix} \quad (9)$$

where u and v are the horizontal and vertical image coordinates respectively, and z is the depth value.

As this Jacobian operates on each pixel independently, requiring only the pixel coordinates, it can be computed during rendering in the OpenGL™ shader pipeline. In addition to the actual textured image, embodiments can render four derivative images. Each of the twelve derivatives (two image coordinates with respect to each of six degrees of freedom) is rendered to a channel of one of these images. At each step of the BFGS optimisation, the process renders a new scene at the current pose, and calculates the NID 609 and Jacobians 618 based on that scene. This results in every evaluation being based on the prior being sampled at exactly the resolution of the live camera image; the prior is sampled at the center of every pixel. As a result, embodiments of the method are not provably convergent, as they effectively change the data used for each evaluation; a new synthetic image is used each time. However, in practice, the function has a large convergence basin.

The entire cost function pipeline is evaluated on the GPU in some embodiments. Synthetic camera images from the prior can be generated by OpenGL™, and shared with OpenCL (http://www.khronos.org/opencl/) kernels, which carry out the histogram (607, 616) and NID (609, 618) calculations. As a result, not only do embodiments exploit the data-parallel nature of the computations, but they can also avoid the time-consuming reading of entire images back from the GPU. This allows embodiments to localise at a rate of approximately 2 Hz.

The derivative of NID shows which direction gives the fastest reduction in NID, which is beneficial for minimizing the NID. Furthermore, the values of the derivative from successive iterations is used to estimate the Hessian (second derivatives), which is used in conjunction with the derivatives to choose which direction to search. Thus, the results of the NID calculations 609, 618 are used to determine the search direction 620 within the map of the environment in order to find the best current pose estimate.

In order to assess the ability of an embodiment of the system to localise in an environment, a vehicle as illustrated in FIG. 1 was driven eight laps around a loop of roads totalling approximately 5.6 km in an experiment. A mesh prior was built from the laser and Ladybug2 data. Localisation was then performed using the same dataset, but with Grasshopper2 cameras. This allowed a very accurate ground truth for comparison, as it used the same odometry feed as was used to build the map. Although the structure of the scene was thus the same during localisation as during the map-building phase, given that different images were used, compared with those used to texture the map, there were large differences in appearance.

FIGS. 9(a)-9(f) are histograms showing displacement between the localised solution and ground truth in each degree of freedom. The coordinate system places x in the direction of the vehicle's travel, y to the vehicle's right, and z downwards into the road. Approximately 7% of locations failed to converge on a solution—these are not shown in the histograms. The vast majority of locations show an error of less than 5 cm in the translational dimensions, and less than 1° in the rotational dimensions. The table below shows the RMS errors in each degree of freedom/for each of the axes:

|   | RMS error |
|---|---|
| x (m) | 0.0742 |
| y (m) | 0.0373 |
| z (m) | 0.0490 |
| $r_x$ (°) | 0.9183 |
| $r_y$ (°) | 0.3159 |
| $r_z$ (°) | 0.3571 |

Figure 10A:
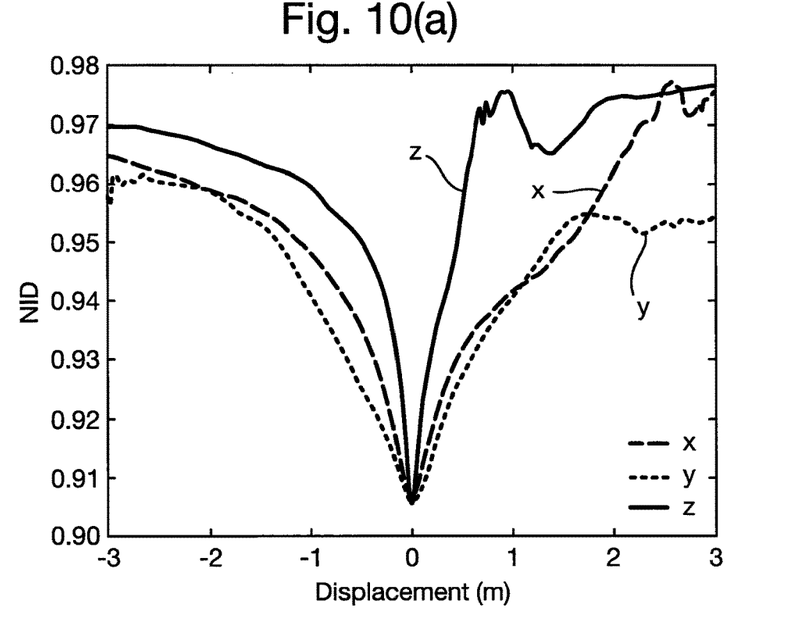
FIG. 10(a)-10(b) are graphs showing NID values produced during an example run of the process.
Figure 10B:
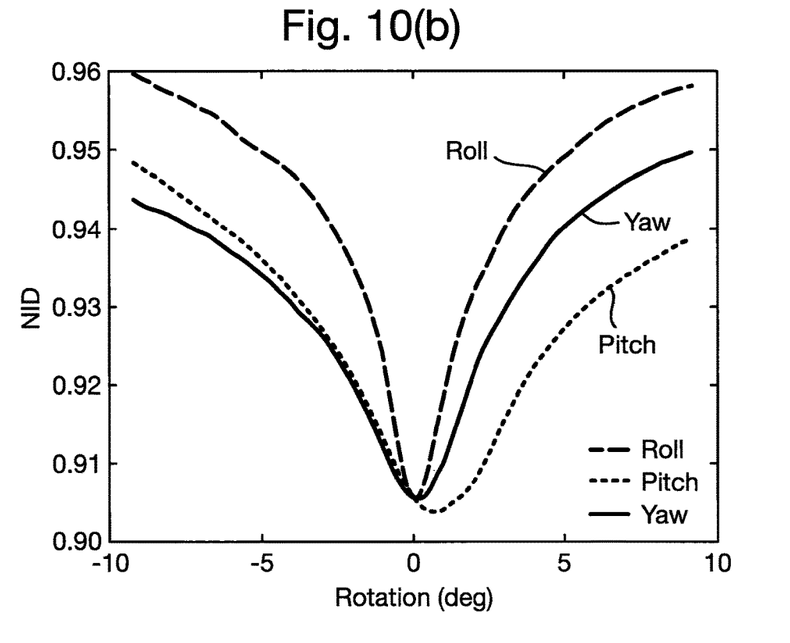

FIGS. 10(a)-10(b) show how the NID varied with movement in each axis from the ground truth position. These plots are averaged across 20 different locations. In FIG. 10(a) translational axes are shown, whilst in FIG. 10 (b) rotational axes with roll, pitch and yaw are shown. The second local minimum in the z axis is due to the road looking very similar when rendered from below as it does from above. The functions all have a minimum indistinguishable from the ground truth position, with the exception of pitch, whose minimum is less than a degree from zero. The curve from z has a local minimum at approximately +1:5 m—this is due the virtual camera being below the road, and the projection of the road looking very similar from this position as it does from above.

Figure 11A:
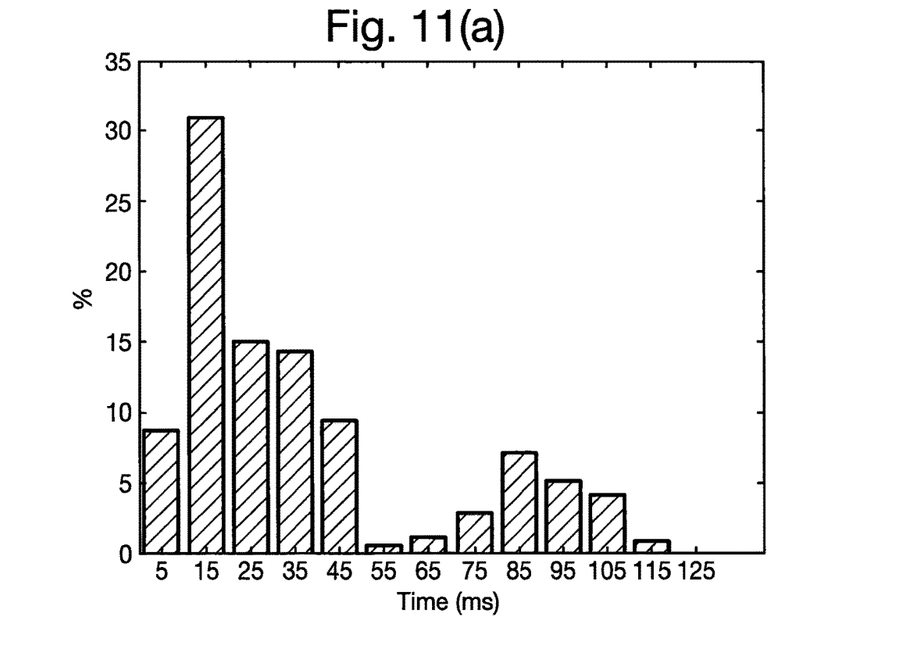
FIGS. 11(a)-11(b) are graphs showing behaviour during the example run.
Figure 11B:
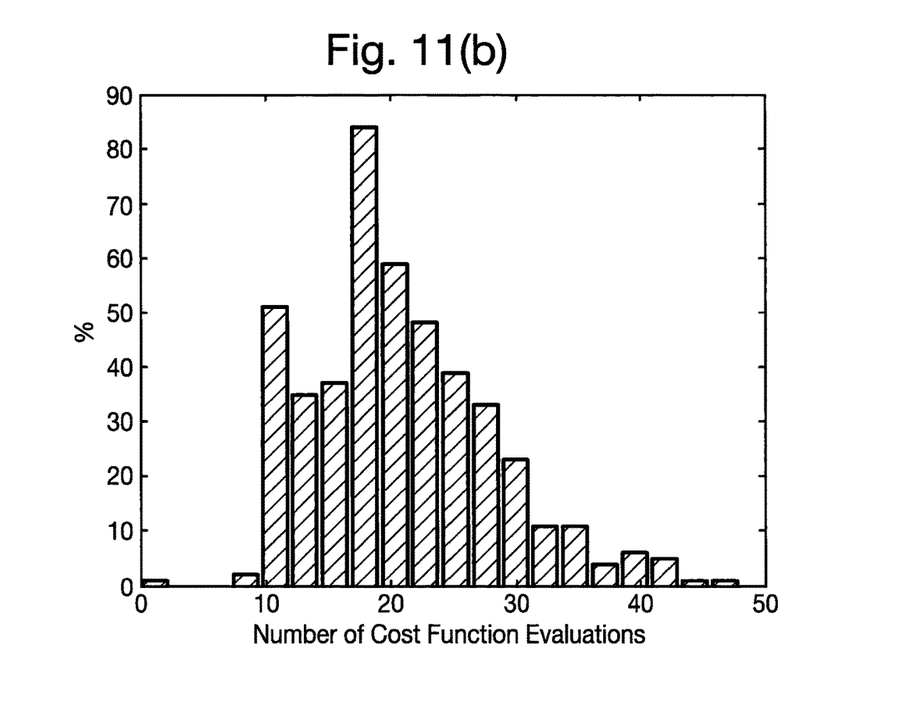

FIG. 11(a) shows a histogram of the time taken to evaluate the NID between the live camera image and the prior. The mean time taken to evaluate the cost function was approximately 35 ms, but the majority of evaluations took less than 25 ms. The vast majority of the time taken in the NID evaluation is used in building the joint histogram between the two images—this requires essentially random memory access for writing to the histogram, resulting in less of a speed advantage on the GPU compared to other parts of the pipeline. A single localisation generally required approximately 20 cost function evaluations, as can be seen in FIG. 11(b). Over the course of the example 6 km of data, localisation was performed at approximately 2 Hz.

Figure 12A:
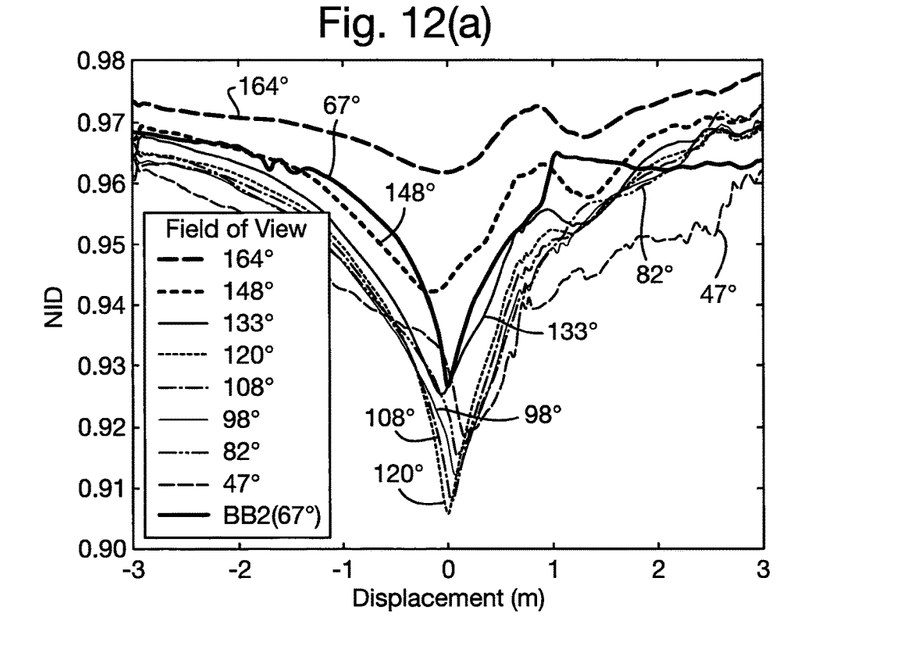
FIGS. 12(a)-12(b) are graphs showing NID values produced during an example run.
Figure 12B:
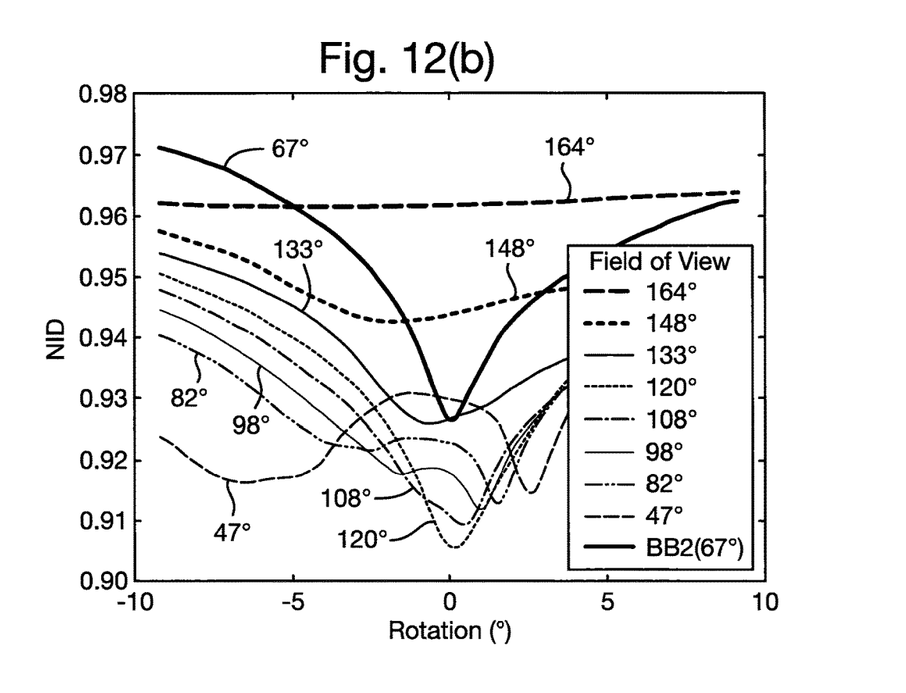

The OCamCalib toolbox (see D. Scaramuzza, A. Martinelli, and R. Siegwart, "A toolbox for easily calibrating omnidirectional cameras," in IEEE International Conference on Intelligent Robots and Systems, 2006, pp. 5695-5701) used in the experiment for generating camera models allowed the building of models for different fields of view, with wider fields of view yielding more distorted images. FIGS. 12(a)-12(b) show NID curves averaged across the three translational and rotational axes, respectively. Up to around a 120° field of view, increasing the field of view increased the smoothness of the cost function, both making the convergence basin deeper and the minimum more accurate. This allowed the system to localise accurately with an initial estimate as much as 1.3 m away from the true position in horizontal directions, and 10° in rotation.

When the field of view was increased beyond 120°, the minimum of the cost functions started to become less clear. At 148°, localisation is still possible—although the rotational minima are not precise, they are still within 5° of the true value. The loss in precision, however, brought a wider convergence basin. Beyond 150°, and the cost functions become virtually unusable.

With extremely large fields of view, small changes in the pose of the camera did not change the image much, resulting in much flatter cost functions. At extremely narrow fields of view, only a small part of the camera image was used, and as a result not much information was available for localisation. The 120° field of view result gave the best combination of a wide convergence basin and accurate minimum.

Embodiments of the system can successfully localise a vehicle within a textured prior using only a monocular camera. Experimental performance of the system on 6 km data captured on real-world roadways showed it to be both robust and precise, with RMS errors of less than 8 cm and 1 degree and a wide convergence basin of over 1.3 meters in each direction. Due to the data-parallel nature of the problem, embodiments are able to exploit GPU computation to carry out localisation at approximately 2 Hz. The ability to robustly localise with centimeter-level precision using only monocular cameras can help enabling low cost autonomy for road vehicles and other applications.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of localising portable apparatus in an environment, the method comprising:
   obtaining captured image data representing an image captured by an imaging device associated with the portable apparatus;
   obtaining mesh data representing a 3-dimensional textured mesh of at least part of the environment;
   processing the mesh data to generate a plurality of distorted synthetic images, each said distorted synthetic image being associated with a pose within the environment and being a simulation of a distorted image that would be captured by the imaging device from that associated pose;
   analysing the plurality of distorted synthetic images to find a said distorted synthetic image similar to the captured image data;
   providing an indication of a pose of the imaging device of the portable apparatus within the environment based on the associated pose of the similar distorted synthetic image,
   wherein processing the mesh data comprises:
   obtaining distortion data representing a distortion produced by a lens of the imaging device, and
   using the distortion data to generate the distorted synthetic image.

2. The method according to claim 1, wherein using the distortion data comprises:
   mapping undistorted image coordinates of the distorted synthetic image to distorted image coordinates of the distorted synthetic image based on the distortion data using a B-spline interpolation process to interpolate a look-up table that represents a mapping of the undistorted image coordinates to the distorted image coordinates.

3. The method according to claim 2, wherein analysing the plurality of distorted synthetic images to find a said distorted synthetic image similar to the captured image data comprises finding a minimum of a cost function of a said distorted synthetic image and the captured image data, and wherein the cost function comprises Normalised Information Distance (NID).

4. The method according to claim 3, wherein a Broyden-Fletcher-Goldfarb-Shanno (BFGS) algorithm is used to find the minimum NID.

5. The method according to claim 4, comprising:
   using the BFGS algorithm to find the minimum NID of a joint histogram based on a said distorted synthetic image and the captured image data;
   applying the B-spline interpolation process to find a Jacobian for the look-up table;
   using depth information from the distorted synthetic image to produce a spatial Jacobian for the distorted synthetic image;
   applying the B-spline interpolation process to the distorted synthetic image to produce an appearance Jacobian for the distorted synthetic image;
   generating a histogram Jacobian based on the joint histogram and the appearance Jacobian for the distorted synthetic image; and
   using the histogram Jacobian with the BFGS algorithm to find the minimum NID.

6. The method according to claim 5, wherein applying the B-spline interpolation process to the distorted synthetic image to produce the Jacobian image for the distorted synthetic image comprises:
   executing a B-spline pre-filter over the distorted synthetic image to produce a differentiable image with pixel values useable as control points for a B-spline;
   producing a continuous, differentiable intensity surface using the control points; and
   differentiating the surface to produce the Jacobian image for the distorted synthetic image.

7. The method according to claim 3, wherein finding the minimum of the cost function and generating of each of the distorted synthetic images are performed on a Graphics Processing Unit (GPU), and wherein the GPU performs at least finding the minimum of the cost function using data-parallel operations.

8. The method according to claim 1, wherein processing the mesh data to generate the plurality of distorted synthetic images comprises for a said distorted synthetic image:
   generating a first synthetic image at a first resolution;
   generating a second synthetic image at a second resolution, wherein the second resolution is lower than the first resolution; and
   generating the distorted synthetic image using the second synthetic image to fill gaps in the first synthetic image.

9. The method according to claim 1, wherein obtaining the mesh data comprises:
   obtaining a set of scans representing a 3D survey of part of the environment; generating a mesh using the set of scans;
   obtaining a set of captured images corresponding to the part of the environment of the set of scans; and
   projecting the mesh into each image in the set of captured images to produce the textured mesh data.

10. The method according to claim 9, wherein projecting the mesh into each image in the set of captured images comprises:
    projecting the mesh into a said image using a projective property of a device/camera used to capture the image; and
    distorting the mesh according to the projective property.

11. A device adapted to localise portable apparatus in an environment, the device comprising:
    a component configured to obtain captured image data representing an image captured by an imaging device associated with the portable apparatus;
    a component configured to obtain mesh data representing a 3-dimensional textured mesh of at least part of the environment;
    a component configured to process the mesh data to generate a plurality of distorted synthetic images, each said distorted synthetic image being associated with a pose within the environment and being a simulation of an image that would be captured by the imaging device from that associated pose;
    a component configured to analyse the plurality of distorted synthetic images to find a said distorted synthetic image similar to the captured image data; and a component configured to provide an indication of a pose of the portable apparatus within the environment based on the associated pose of the similar distorted synthetic image, wherein processing the mesh data comprises:
obtaining distortion data representing a distortion produced by a lens of the imaging device, and
using the distortion data to generate the distorted synthetic image.

12. The device according to claim 11, further comprising the imaging device, wherein a lens of the imaging device comprises a wide angle lens.

13. A vehicle including a device according to claim 11.

14. A non-transitory computer readable medium storing a computer program that when executed by one or more processors causes a process to be carried out for localising portable apparatus in an environment, the process comprising:

obtaining captured image data representing an image captured by an imaging device associated with the portable apparatus;

obtaining mesh data representing a 3-dimensional textured mesh of at least part of the environment;

processing the mesh data to generate a plurality of distorted synthetic images, each said distorted synthetic image being associated with a pose within the environment and being a simulation of an image that would be captured by the imaging device from that associated pose;

analysing the plurality of distorted synthetic images to find a said distorted synthetic image similar to the captured image data; and providing an indication of a pose of the portable apparatus within the environment based on the associated pose of the similar distorted synthetic image, wherein processing the mesh data comprises:
obtaining distortion data representing a distortion produced by a lens of the imaging device, and
using the distortion data to generate the distorted synthetic image.

15. The computer readable medium according to claim 14, wherein analysing the plurality of distorted synthetic images to find a said distorted synthetic image similar to the captured image data comprises finding a minimum of a cost function of a said distorted synthetic image and the captured image data, and wherein the cost function comprises Normalised Information Distance (NID).

16. The computer readable medium according to claim 15, wherein finding the minimum of the cost function and generating of the distorted synthetic images are performed on a Graphics Processing Unit (GPU), and wherein the GPU performs at least finding the minimum of the cost function using data-parallel operations.

17. The computer readable medium according to claim 14, wherein processing the mesh data to generate the plurality of distorted synthetic images comprises for a said synthetic image:

generating a first distorted synthetic image at a first resolution;

generating a second distorted synthetic image at a second resolution, wherein the second resolution is lower than the first resolution; and generating the distorted synthetic image using the second distorted synthetic image to fill gaps in the first distorted synthetic image.

18. The computer readable medium according to claim 14, wherein obtaining the mesh data comprises:

obtaining a set of scans representing a 3D survey of part of the environment; generating a mesh using the set of scans;

obtaining a set of captured images corresponding to the part of the environment of the set of scans; and projecting the mesh into each image in the set of captured images to produce the textured mesh data.

* * * * *